Figure 1:
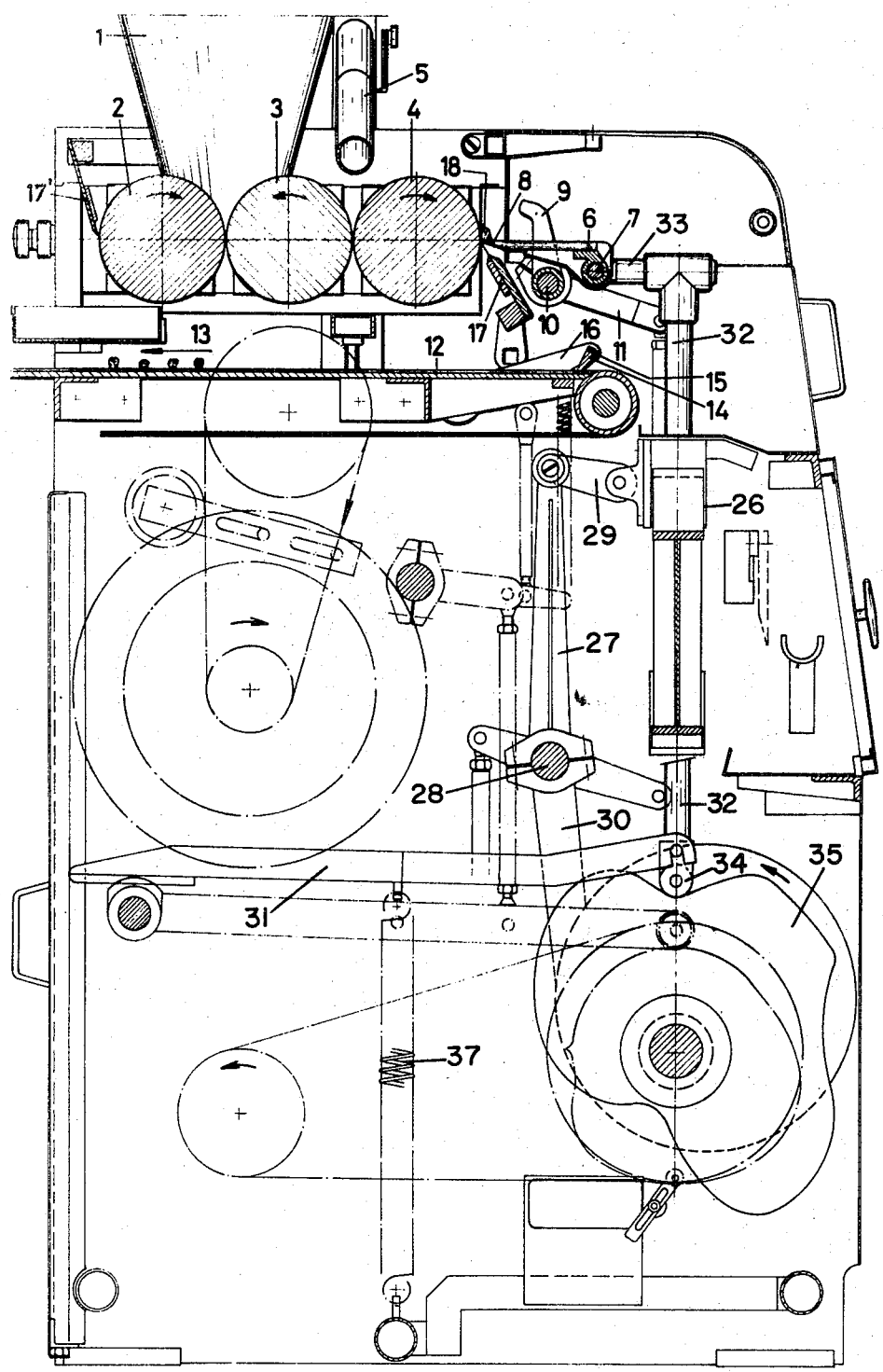

United States Patent [19]
Bensdorp

[11] 3,850,561
[45] Nov. 26, 1974

[54] METHOD AND APPARATUS FOR PRODUCING BARKY CHOCOLATE

[75] Inventor: Josef Ernst Marie Bensdorp, Bussum, Netherlands

[73] Assignee: Bensdorp International N.V., Bassum, Netherlands

[22] Filed: Apr. 14, 1972

[21] Appl. No.: 243,947

[30] Foreign Application Priority Data
Apr. 16, 1971 Netherlands .................... 7105135

[52] U.S. Cl. .................. 425/223, 425/335, 425/308
[51] Int. Cl. ............................................. A23g 1/20
[58] Field of Search .......... 425/223, 335, 363, 310, 425/315, 337, 215, 308

[56] References Cited
UNITED STATES PATENTS
2,107,735    2/1938    Honig ............................ 425/335 X
2,323,907    7/1943    Harriss et al ...................... 425/335
2,693,154    11/1954   Appleton ........................ 425/363 X

*Primary Examiner*—Andrew R. Juhasz
*Assistant Examiner*—David S. Safran
*Attorney, Agent, or Firm*—Cushman, Darby & Cushman

[57]          ABSTRACT

An automatic apparatus for producing barkies by scraping chocolate paste film from a roller fed by a funnel. The strip obtained by upsetting the chocolate film is, while still in soft condition, cut into pieces on the collecting plate and is transferred to a discharge conveyor.

3 Claims, 2 Drawing Figures

METHOD AND APPARATUS FOR PRODUCING BARKY CHOCOLATE

The invention relates to a method of producing chocolate in the form of so-called barkies, by which elongated pieces of chocolate are meant having a ribbed outer surface and longitudinally extending small channels, which impart to the piece of chocolate the appearance of bark particularly in cross-section.

According to the invention barkies are produced by applying the so-called chocolate paste as a thin film on a rotary cylinder, transferring the film by means of a scraper extending according to a generating line of the cylinder to a plate-shaped collecting means till it has accumulated to a strip of desired transverse dimensions, after which the collecting means is moved away from the cylinder, the accumulated strip is cut into pieces of the desired length and the barkies obtained are discharged.

For carrying out this method the invention provides an apparatus which is characterized by a chocolate paste reservoir, means for applying paste from the reservoir as a film onto a horizontal roller, a scraper which can be pressed horizontally with its free edge against the roller surface, a collecting plate which can swing about a horizontal shaft and a knife edge bearing on the side of the free collecting plate edge which can be pressed against the scraper, said side being directed away from the roller. The chocolate film is transferred to the collecting plate edge by the scraper urged thereagainst to form upset, superposed small ribs, which extend longitudinally thereof.

According to the invention the chocolate reservoir may be constructed as an elongated container with a funnel-shaped cross-section, the bottom of which is formed by sectors of two opposedly rotating rollers a thrust roller and a transfer roller, with shafts parallel to the longitudinal direction of the feed funnel, while the roller on which the paste film is deposited is located on the side of the transfer roller directed away from the thrust roller. Owing to this the roller is accessible to the scraper and the collecting plate, as well to as cooling means for keeping the roller at the correct temperature which in connection with the paste consistency for forming loops on the collecting plate edge is very important.

For automatically cutting the chocolate strip accumulated on the free edge of the collecting plate into separate barkies, the free leading edge of the collecting plate according to the invention may be provided with cuts spaced over the edge length and directed normal the leading edge for admitting the knives of the knife edge bearing. For according to the invention the path of movement of the free edge of the collecting plate may extend from the thrust place of the scraper on the roller, vertically, against the direction of rotation of the roller and takes the collecting plate edge spaced from the roller within the reach of the knives and a path which takes the collecting plate edge adjacent a discharge conveyor.

The vertically upwardly directed movement of the collecting plate edge ensures that when said edge is moved away from the roller no paste film is removed from the roller. Once within the reach of the knifes, the knife edge bearing makes a swinging movement whereby the knives cut the chocolate strip accumulated on the collecting plate edge to size to form the desired barkies.

According to the invention, for transferring the shaped barkies from the collecting plate to the conveyor it is possible to bring a scraper intermittently into the path of movement of the collecting plate leading edge in the path adjacent the discharge conveyor. According to the invention, the scraper may have the shape of a frame which can be swung about a movable, horizontal shaft, which frame which can be brought across the collecting plate edge with chocolate accumulated thereon by means of a lever connected with the swivel shaft, so that the collecting plate can be withdrawn to leave the chocolate on the discharge conveyor.

As the barkies are in a still fairly hot condition during transfer from the collecting plate to the conveyor belt, they may stick to the scraper. To avoid this the control of the scraper according to the invention may be such that after the collecting plate is withdrawn the lever moves the scraper-swivel shaft abruptly upwardly, so that the scraper makes a sudden, centrifugal swivel movement about the shaft.

The invention will now be described with reference to the drawings wherein

Figure 2:
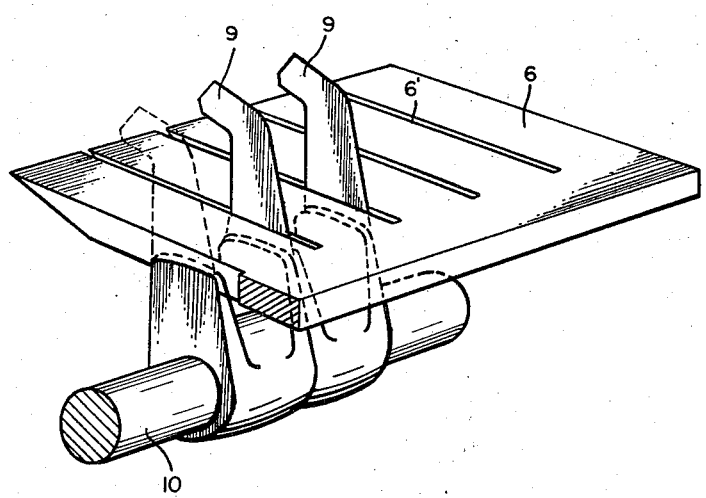

FIG. 1 is a vertical cross-sectional view of an exemplary apparatus according to the teachings of the present invention, and FIG. 2 is a perspective view of the knives and the collecting plate according to the teachings of the present invention.

An exemplary barky chocolate-producing machine is shown in the drawings, said machine comprises a feed funnel 1 for chocolate paste. On the bottom of the elongated funnel there are two rollers, a thrust roller 2 and a transfer roller 3. The paste is drawn in the nip between the rollers 2 and 3, sticks to the roller 3 and is transferred to a roller 4, which is located on the side of the roller 3 directed away from the roller 2. Between the rollers 2 and 4 there is provided a means 5 which can blow cooling air on the rollers.

On the side of the roller 4 which is directed away from the roller 3 there is provided a collecting plate 6 which is controlled to swing about a shaft 7. The collecting plate 6 extends over substantially the full length of the roller 4, which in turn has substantially the same length as the funnel 1.

In the bevelled, free leading edge 8 of the collecting plate 6 there are made vertical cuts transverse to the edge 8, through which cuts knives 9 extend upwardly. The knives are connected to form a bearing 10, which is laterally supported by an arm 11, the arrangement being such that the collecting plate 6 can be moved to below the knife edge bearing 10. The free upper end of the knives 9 is curved towards the roller 4. On a lower level than the assembly of the collecting plate 6 and the knives 9 there is located a discharge conveyor belt 12, whose upper part is movable in the direction of the arrow 13. At the inlet end of the belt 12 a scraper 14 is mounted to swivel about a shaft 15 on a lever 16. The scraper 14 extends over a distance substantially equal to the length of the collecting plate 6. On both sides of the assembly of the rollers 2, 3 and the roller 4 scrapers 17 and 17' have been provided, of which the scraper 17 rests against the roller 4 according to a generating line, adjacent the axis of the roller.

The drive for the rollers 2 and 3, the roller 4, the collecting plate 6 and the scraper 14 is located below the conveyor belt and may be provided for example with motor-driven cam discs, levers, plungers and the like. An exemplary drive for the collecting plate 6 and the knives 9 is shown in FIG. 1. An arm 33 may mount the shaft 7, which arm 33 is connected to one end of a rod 32. The rod 32 has a cam-following roller 34 at the other end thereof, and reciprocatory movement of the rod 32 is controlled by the tubular frame member 26. A lever 31 and biasing spring 37 therefor biases the roller 34 into contact with the surface of a cam 35, and rotation of the cam 35 causes reciprocation of the rod 32 to control the up and down movement of the collecting plate. To control the lateral movement of the collecting plate 6, a lever system such as shown at 27, 29, 30 in the drawings may be employed. Lever 29 is pivotally connected to frame 26 at one end thereof, and to lever 27 at the other end thereof. Levers 27 and 30 are arranged to rotate with the shaft 28 in response to a cam follower (not shown) on the end of the lever 30 remote from the shaft engaging and being moved by a cam, eccentric, or the like. The combined lateral and up and down movements results in the swinging movement of plate 6. The relative configurations and orientations of the cam 35 and the cam controlling the lever 30 determine exactly what path the collecting plate 6 will take in moving away from the scraper 17 and the roller 4.

After the plate 6 has moved a certain perdetermined lateral distance away from the roller 4, the arm 11 supporting the bearing 10 of the knives 9 may be moved by any suitable conventional means, such as a cam and follower arrangement, to rotate the blades 9 about bearing 10 and pass the blades 9 through the slots 6' in the plate 6 to cut the chocolate thereon. In this way the chocolate is conveniently moved away from the roller 4 and cut while still hot.

The apparatus operates as follows:

The paste film formed on the upper half of the roller 4 is moved adjacent roller 4, rotating in accordance with the arrow, to the scraper 17 urged against the roller, which scraper scrapes the film from the roller and deposits same on the leading edge 8 of the collectint plate 6, where it accumulates to form small loops extending one beside the other and one on top of the other over the length of the leading edge 8 to form a strip or ribbon of barky chocolate 18. When the strip 18 has reached the desired transverse dimensions the movement of the roller 4 is interrupted. The collecting plate 6 stops for some time, while the knives 9 are rotated about bearing 10 by lever 11 to pass through the slits 6' in the plate 6, cutting the strip of barky chocolate 18 into a plurality of aligned "barkies". The collecting plate 6 subsequently moves upwardly through a slight distance so that the chocolate strip 18 formed is lifted from the paste film sticking to the roller 4, and the plate 6 is subsequently moved laterally and vertically in a swinging movement away from the roller 4.

The collecting plate 6 subsequently moves over the knife edge bearing 10 rearwardly, behind the bearing 10 downwardly and tilts with its bevelled leading edge 8 to the inlet end of the discharge conveyor 12, till the bevelled part on the bottom of the edge 8 comes to rest on the upper part of the belt 12. The scraper 14 has meanwhile been moved upwardly by the lever 16 and is subsequently placed behind the chocolate strip 18 on the collecting plate 6. The collecting plate 6 is now withdrawn, so that the barkies are located before the scraper, that is to say, seen in the transport direction of the upper part of the belt 12, on the discharge side thereof.

Approximately simultaneously with the withdrawal of the collecting plate 6, the arm 16 moves the scraper 14 abruptly upwardly, so that the scraper 14 exercises an abrupt centrifugal swivelling movement, that is to say to the right in the drawing, about the swival shaft 15. Still fairly hot barkies possibly sicking to the scraper are thereby lifted and fall on the conveyor 12, which discharges the barkies in accordance with the arrow 13.

The collecting plate 6 is returned to the scraper 17 adjacent the roller 4 and the cycle can restart by actuating the roller 4.

By the apparatus according to the invention it is possible to produce uniform barkies completely automatically in an extremely simple, fast and efficient manner; the only thing that has to be checked is the amount of paste in the funnel 1.

I claim:

1. Apparatus for producing chocolate in the form of barkies comprising: a chocolate paste reservoir; a horizontal roller mounted for rotation about its axis; means for applying paste from the reservoir as a film onto the horizontal roller; a scraper having a free edge engageable with the surface of said roller to thereby scrape the film from the roller onto that surface of the scraper which faces upstream with respect to the direction of rotation of the roller; a collecting plate having a free edge adjacent the upstream surface of the scraper for receiving the film scraped from the roller; and means mounting the collecting plate for swinging movement about a horizontal axis parallel to the axis of the roller so that the plate can move away from the scraper.

2. Apparatus as in claim 1 wherein the chocolate paste reservoir is a horizontally elongated container with a funnel-shaped vertical cross-section, said means for applying paste from the reservoir onto said horizontal roller including a rotating thrust roller and an oppositely rotating transfer roller which together form the bottom of said reservoir, said thrust roller and said transfer roller having axes parallel to the elongated dimension of said container, said horizontal roller being located on the side of the transfer roller directed away from the thrust roller.

3. Apparatus as in claim 1 wherein the free edge of said collecting plate has a plurality of cuts spaced therealong and extending normal to the axis of said roller, said apparatus further including a knife extending through each cut.

* * * * *